United States Patent [19]

Schmidle et al.

[11] Patent Number: 4,491,616
[45] Date of Patent: Jan. 1, 1985

[54] RESINOUS POLYMER SHEET MATERIAL HAVING SURFACE DECORATIVE EFFECTS OF CONTRASTING GLOSS AND METHOD OF MAKING THE SAME

[75] Inventors: Claude J. Schmidle, Trenton, N.J.; Seevaram N. Varadhachary, Newtown, Pa.

[73] Assignee: Congoleum Corporation, Kearny, N.J.

[21] Appl. No.: 582,157

[22] Filed: Feb. 27, 1984

Related U.S. Application Data

[63] Continuation of Ser. No. 382,895, May 28, 1982, abandoned.

[51] Int. Cl.³ .............................. B32B 3/30; B05D 3/06
[52] U.S. Cl. ........................................ 428/158; 427/44; 427/280; 427/272; 428/159; 428/201; 428/212; 428/308.4; 428/913
[58] Field of Search ................. 428/158–160, 428/161, 201, 212, 304.4, 913, 308.4; 427/44, 280, 272.2

[56] References Cited

U.S. PATENT DOCUMENTS

| | | | |
|---|---|---|---|
| 3,293,094 | 12/1966 | Nairn et al. | 428/158 |
| 4,210,693 | 7/1980 | Regan et al. | 428/161 |
| 4,214,028 | 7/1980 | Shortway | 428/159 |
| 4,309,452 | 1/1982 | Sachs | 427/44 |

Primary Examiner—Paul J. Thibodeau

[57] ABSTRACT

The invention relates to a resinous polymer sheet material having surface decorative effects of contrasting gloss and to the method of making the same. The material is made by applying to a base a printing composition layer forming a pattern with designated areas containing a photoinitiator and then applying to said printing composition layer a resinous polymer wear layer having therein an actinic radiation curable polymerizable and cross-linkable monomeric materials. The composite thus produced is exposed to actinic radiation so that the areas above where the photoinitiators were applied are cross-linked. The product is then heated to form the composition. The resulting product has a lower gloss in such areas as compared to the remainder of the surface of the sheet.

11 Claims, 5 Drawing Figures

RESINOUS POLYMER SHEET MATERIAL HAVING SURFACE DECORATIVE EFFECTS OF CONTRASTING GLOSS AND METHOD OF MAKING THE SAME

This application is a continuation of application Ser. No. 382,895 filed May 28, 1982 now abandoned.

The present invention relates to decorative sheet materials, and more particularly to decorative resinous polymer sheet materials having controlled, selective placement of surface decorative effects of use as floor, wall and ceiling coverings; desk, table and counter tops; surface layers on leather, fabrics, wood, paper, paper products, glass, metals plastics, etc.; upholstery, drapery, clothing and apparel materials; interiors for cars, trucks, trains, airplanes, and other vehicles or other means of transportation; covers for books, periodicals and other publications; boxes, cartons, containers, and other receptacles; maps, road markers and similar and like articles. Even more particularly, the present invention is concerned with resinous polymer decorative sheet materials having smooth, glossy or lustrous surfaces in some areas; or dead or dull mat surface in other areas; or glossy or lustrous surfaces in still other areas; or smooth, dead or dull mat surfaces in still other areas; all of such areas sharply contrasting with each other and can be in perfect registry with a pattern or design printed on such decorative sheet materials.

Decorative sheet materials of a resinous polymer composition have been manufactured for many years and one of the commonest means of creating or enhancing the decorative effects has been to provide selected portions of the surface of such decorative sheet materials with different typs of contrasting finishes or effects, or surface gloss or luster differentials, for example, with smooth, glossy or lustrous surfaces; embossed, dead or dull mat surfaces; embossed, glossy or lustrous; and smooth, dead or dull mat surfaces, all sharply contrasting with one another.

Many methods, including differential mechanical embossing, inlaying or chemical etching, and other methods, have been devised to provide such sharply contrasting surfaces but all of such prior art methods have always left something to be desired. For example, differential mechanical embossing combined with pattern or design printing has always created registration problems and related difficulties. Inlaying and chemical etching methods have normally been costly and process-time consuming. U.S. Pat. No. 3,958,043 issued to Allan W. McKee, Jr., and Jack H. Witman, on May 18, 1976 also discloses such a process utilizing cross-linking monomers.

It is therefore a principal purpose and object of the present invention to provide resinous polymer compositions in sheet material form having selective, surface decorative effects created by the controlled placement of various different surface finishes, embossings, or surface gloss differentials wherein smooth or embossed glossy or lustrous surface areas sharply contrast with each other and with smooth or embossed dead or dull mat finish surfaces, using methods in which registration problems and difficulties are substantially completely eliminated and which methods are neither costly nor process-time consuming.

It has been found that such principal purposes and objects, and other principal purposes and objects which will become clear from a further reading and understanding of this disclosure. The product of this invention comprises a base layer or substrate; a printing composition layer forming a pattern or design areas on said base layer or substrate; some of said design areas containing a photoinitiator; and a resinous polymer wear layer over said printing composition layer containing an actinic radiation curable polymerizable and cross-linkable monomeric materials and having a dull surface appearance corresponding to the areas above the areas containing the photoinitiator.

The invention further provides a method of making a resinous polymer sheet material having surface decorative effects comprising laying down or forming a base layer or substrate; applying a printing composition layer forming a pattern or design on said base layer or substrate; some of said design areas containing a photoinitiator; applying to said printing composition layer a resinous polymer wear layer having substantially uniformly therein an actinicradiation curable polymerizable and cross-linkable monomeric materials, subjecting the composite to actinic radiation to cause said polymerization initiator to bring about a reaction polymerizing and cross-linking said reactive polymerizable and cross-linkable monomeric materials in the areas above where the photoinitiator was applied and then heating to fuse the composition. It has been found that such differential cross-linking can cause cross-linked areas to have a dull or mat surface as contrasted with the other areas not so cross-linked.

It is to be appreciated that the above simplified and abbreviated illustrative method is merely one of several variations capable of making the resinous polymer sheet materials of the present invention; that it is merely illustrative of the broader aspects of the present invention; and that some conventional and standard steps, such as, for example, heating, gelling, cooling, drying, etc., have been omitted for purposes of clarity and brevity.

In the following specificiation and accompanying self-explanatory drawings, there are described and illustrated preferred and typical embodiments of the present invention but it is to be appreciated that the present invention is not to be construed as limited to such preferred and typical embodiments as are specifically disclosed and illustrated therein but to include other similar and equivalent embodiments, as are determined by the scope and the spirit of the appended claims.

Referring to the accompanying self-explanatory drawings.

Figure 4:
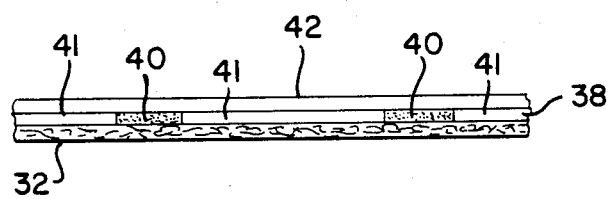
FIG. 4 is a fragmentary, diagrammatic, elevational, cross-sectional view of another embodiment of the present invention, showing the structure thereof, prior to heating and fusion.
Figure 4A:
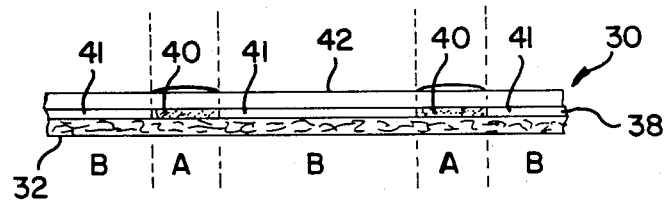

FIG. 4A is a fragmentary, diagrammatic, elevational, cross-sectiqnal view of the embodiment of FIG. 4, showing the structure after heating and fusion. These Figures have not been drawn precisely or accurately to scale. Some portions and some dimensions therein have been drawn to a slightly larger scale, whereas certain other portions and dimensions therein have been drawn to a slightly smaller scale. This has been done merely to bring out more clearly some of the details of the smaller portions and to accentuate some of the more important features and aspects of the present invention, such as the thickness of the printing ink composition layer which has been drawn increased manyfold in the Figures.

Figure 1:
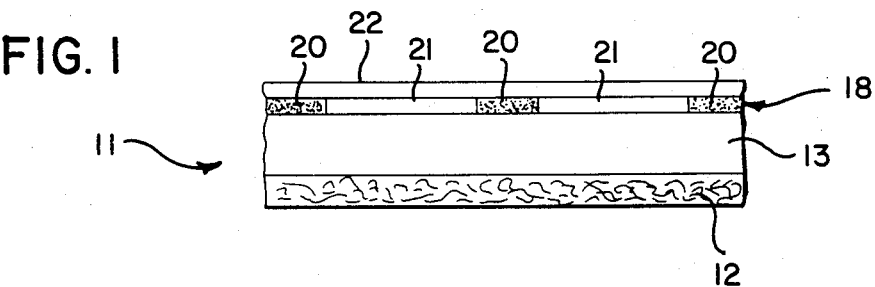
FIG. 1 is a fragmentary, diagrammatic, elevational, cross-sectional view of one embodiment of the present invention, showing the resinous polymer composition in its initial form, containing a blowing agent, prior to heating and blowing.
Figure 2:
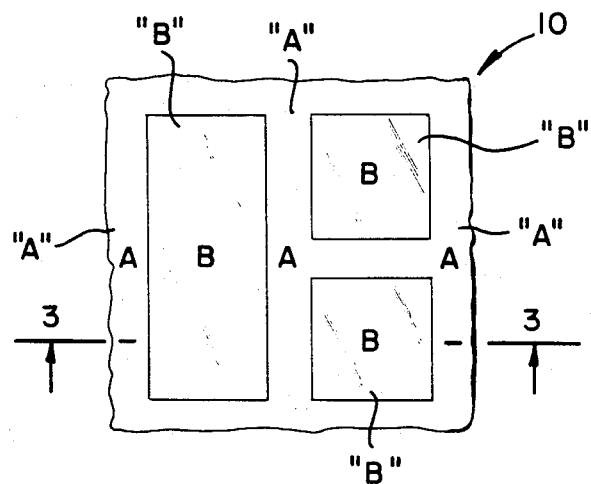
FIG. 2 is a fragmentary, diagrammatic, plan view of the resinous polymer composition of FIG. 1, but shown in its final form, after heating and blowing.
Figure 3:
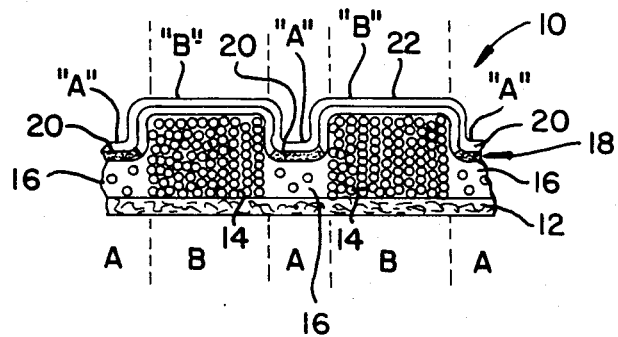
FIG. 3 is a fragmentary, diagrammatic, elevational, cross-sectional view of the embodiment of FIG. 1, also shown in its final form after heating and blowing, the cross-section being taken on the line 3—3 of FIG. 2.

The present invention will be generally described and illustrated primarily with reference to FIGS. 1 to 3, which are illustrative but not limitative of the scope of the broader aspects of the inventive concept. In these Figures, there is illustrated a resinous polymer sheet material 10 comprising a base layer or substrate 11 of a relatively flat sheet backing material 12 and a potentially foamable polymer composition 13 which, after subsequent blowing and foaming at an elevated temperature, possesses a relatively high, blown or foamed, cellular resinous polymer composition 14 and a relatively low, relatively unblown or unfoamed, relatively or substantially non-cellular resinous polymer composition 16. The term "substantially non-cellular" does not mean completely non-cellular but does indicate that the cells therein, if any, are smaller in size and very much fewer in number than the cells in the so-called cellular portions 14. A printing ink composition 18, in the form of a desired pattern or design usually containing many different colors, is applied to the surface of the potentially foamable resinous polymer composition 13.

The pattern or design of the printing ink composition 18 possesses certain predetermined areas or colors 20 which, in this embodiment contain a blowing modifier, such as an inhibitor, and also a photoinitiator. Other predetermined areas or colors 21 do not contain any blowing modifier or any photoinitiator, for purposes to become clearer from a further reading and an understanding of this specification. A resinous polymer composition in the form of a wear layer 22 is applied substantially uniformly over the surface covering the ink composition 13 which contains an actinic radiation curable, polymerizable and cross-linkable monomeric material uniformly dispersed therein.

As noted especially in FIG. 3, the blowing modifier or inhibitor restricts the blowing or foaming of the potentially foamable resinous polymer composition 13 in the areas A which correspond to and are in perfect registry with the areas 20 where the ink was printed. At the same time, blowing or foaming and expansion of the potentially foamable resinous polymer composition 13 is not restricted or deterred in the areas B which do not lie directly over the areas 20 where the blowing modifier or inhibitor was printed.

It is also to be noted that the photoinitiator which is also present in areas 20 causes, for reasons which will be explained in greater detail hereinafter, the surface areas of the wear layer 22 lying directly over the areas 20 to have an embossed flat, dead or dull mat finish or texture, whereas the other areas B of the wear layer 22 not lying directly over the areas 20 have a sleek, glossy or lustrous finish. The two types of finishes are in sharp contrast to each other.

It is also to be realized that the areas 20 not only contain the photoinitiator, but also contain the blow modifier or inhibitor, as well as a predetermined pigment or color of the printing ink composition 18, in accordance with the multi-color pattern or design. As a result, the embossed, flat, dead or dull finish or texture in areas A are in complete and perfect registry with the relatively low, unblown or unfoamed portions 16 of pigment or color of the pattern or design. The smooth, glossy or lustrous finish in areas B are in complete and perfect registry with the relatively high, blown or foamed portions 14 of the resinous polymer composition 13, as well as the other predetermined pigments or colors of the pattern or design.

More specific details of such constructions and their properties of perfect registration of embossing, and finishes or textures, and blown or foamed areas, and their respective colorations, as well as the methods and procedures for obtaining such constructions will be described in greater detail hereinafter with reference to the following preferred and typical embodiments of the present invention.

The base layer or substrate 11 may comprise a relatively flat, fibrous backing sheet material 12 and/or a blown or unblown resinous polymer composition having a chemically embossed or unembossed surface or other relatively flat sheet materials well known in the art.

A relatively flat, backing web or sheet material 12 may be used, if desired or required, as the base layer or substrate 11 for the resinous polymer sheet materials 10 of the present inventive concept. Such a backing sheet material 12 may comprise a felted or matted fibrous sheet of overlapping, intermingled fibers and/or filaments; or a non-woven, knitted, woven, or otherwise textile fabricated construction; or a sheet of resinous polymer composition; or paper or a paper product or similar or like equivalent constructions and materials. A felted fibrous sheet material comprising inorganic fibers, such as asbestos; or organic fibers, such as cellulose, cotton, jute, or rayon; or synthetic or man-made fibers and/or filaments, such as polyolefins, polyamides, acrylics, glass, etc., is the most commonly employed backing sheet material but many others are equally suitable and are utilizable in special situations. Such backing sheet materials are set forth in many prior art patents, such as U.S. Pat. Nos. 3,293,094 and 3,293,108 which were issued on Dec. 20, 1966 to Nairn et al. and U.S. Pat. No. 3,660,187.

The thickness of such a relatively flat backing sheet material 12 will depend to a large extent upon the particular product to be made and the particular subsequent use of which it is intended. Normally, such thicknesses are in the range of from about 10 mils to about 90 mils, but other thicknesses, especially those greater than 90 mils, may be used in special and particular circumstances. The relatively flat backing sheet material 12 may be used by itself as the base layer or substrate, or it may be used in conjunction with other sheet materials, such as, for example, a layer of potentially foamable or nonfoamable resinous polymer composition. Or the relatively flat, backing sheet material 12 may be omitted completely and the foamable or nonfoamable resinous polymer composition may be used by itself. Such resinous polymer compositions may be made by well-known standard and conventional methods and may contain one or more synthetic resins, such as a polymer or copolymer of vinyl chloride, or other resins, such as polyurethanes, as the main constituent resin.

Other constituents of such resinous polymer compositions include: a blowing or foaming agent, such as azodicarbonamide, if a blowing or foaming agent is desired; various accelerator/stabilizers or catalysts such as dibasic lead phthalate, zinc octoate, zinc oxide, lead octoate, dibasic lead phosphite and the like; various light and/or heat stabilizers, and metallic soaps; plasticizers as dioctyl phthalate, butyl benzyl phthalate, dibutyl sebacate, etc.; coloring agents and pigments as titanium dioxide; solvents and diluents as methyl ethyl ketone, mineral spirits etc.; fillers as clay and limestone; and many other conventional and well-known additives and improvement agents.

Although a polymer or copolymer of vinyl chloride in the form of a plastisol is the preferred and typical synthetic resin to be incorporated into the resinous polymer composition, many other resins are as equally applicable, not only in plastisol form but also in organosol, latex, or solvent form. The specific resin and its particular form of use as they are utilized herein, do not relate to the essence of the inventive concept and many other suitable resins are set forth in the United States Patents previously mentioned hereinbefore can be utilized.

Also, although azdicarbonamide is indicated herein in the Examples as the preferred and typical blowing or foaming agent to be included in the resinous polymer plastisol composition, when blowing or foaming is desired or required, many other similar or like equivalent blowing or foaming agents are also applicable within the principle of the present invention. The specific blowing or foaming agent which is used does not relate to the essence of the present invention and many other suitable and acceptable blowing or foaming agents are to be noted in the previously mentioned United States Patents. All that is required is that the blowing or foaming agent has a sufficiently high decomposition temperature that it is not activated or decomposed prematurely during the earlier procedures of heating and gelling, to be described hereinafter.

Specific blowing or foaming agents: azodicarbonamide, N,N'-dimethyl-N,N'-dinitrosoterephthalamide; azobisisobutyronitrile; p,p'-oxybis(benzenesulfonylhydrazide)dinitrosopentamethylene-tetramine; p,p'-oxybis(benzenesulfonylsemicarbazide); barium azodicarboxylate and many others.

In a similar way, many other accelerators, initiators, catalysts, viscosity improvers, light and heat stabilizers, dyes, pigments, plasticizers, antioxidants, fillers, bacteriostats and bacteriocides, and many other additives may be included in the resinous polymer composition. The specific nature and the particular physical and chemical properties and characteristics of the various constituents of the resinous polymer composition do not relate to the essence of the present inventive concept and further specific elaboration of such additives is believed unnecessary and not required. All of these constituents are well known and conventional in the industry and many are set forth in the previously mentioned United States Patents.

The resinous polymer composition is also preferably a dispersion of a synthetic resin in a liquid medium. The dispersion medium can be a plasticizer in the case of a plastisol, or water in the case of an aqueous lates, or it can be an organic solvent in the case of an organosol. Excellent results are obtained with a dispersion of a synthetic resin in a plasticizer as a plastisol and such form is the preferred and typical form for the application of the present invention.

A few preferred and typical plasticizers useful in forming such plastisols are dibutyl sebacate, dioctyl sebacate, dioctyl adipate, didecyladipate, dioctyl azelate, dibutyl phthalate, dicapryl phthalate, dioctyl phthalate, dibutoxy ethyl phthalate, tricresyl phosphate, octyl dephenyl phosphate, dipropylene glycol dibenzoate, butyl benzyl sebacate, dibenzyl sebacate, dibenzyl phthalate, butyl benzyl phthalate.

It is to be appreciated that, although plastisols will be used to further describe the present invention, such is not intended to exclude the use of organosols, aqueous latices and the like which are also utilizable.

The Potentially Foamable Plastisol Composition

A few preferred and typical potentially foamable plastisol compositions are as follows:

| | (Parts by weight, based on 100 parts of resin, phr) | | | | | | | | |
|---|---|---|---|---|---|---|---|---|---|
| | P-6 | P-7 | P-8 | P-5 | P-9 | P-2 | P-10 | P-11 | |
| Polyvinyl chloride, dispersion grade, inh. viscosity 1.0 | 50 | | 100 | | 25 | 75 | | | a |
| Polyvinyl chloride, dispersion grade, inh. viscosity 0.9 | 50 | 100 | | 100 | 50 | | 75 | 100 | b |
| Polyvinyl chloride, blending resin, inh. viscosity 0.9 | | | | | 25 | 25 | 25 | | c |
| Alkyl benzyl phthalate | | | | | | | | | d |
| Polydodecyl benzene | | | | | | 12 | | | e |
| Alkyl aryl modified phthalate ester | 55 | | | | | | | | f |
| Alkyl aryl hydrocarbon | 10 | | 5 | | | | | | g |
| Di(2-ethyl hexyl phthalate | | | 60 | 57 | | 7.09 | | | h |
| Butyl benzyl phthalate | | 57 | | | 57 | 38 | 58 | 53 | i |
| Epoxidized esterified tallate | | | | | | | | 5 | j |
| Mineral spirits (boiling point range 300° F.–425° F. | | | | | | | 1.55 | 1.55 | k |
| Diphenyl decyl phosphite | | | | | | | | | l |
| Dibasic lead phosphite | 1.5 | 1.11 | 1.0 | 1.11 | 1.11 | 1.11 | | 3 | m |
| Zinc oxide | | | | | | | | 0.83 | n |
| Zinc octoate (18% Zn) | | | | | | | | | o |
| Lead octoate (24% Pb) | | | | | | 1.2 | | | p |
| Titanium dioxide | | 5 | 5.29 | 2 | 5.29 | 5.29 | 5.29 | 5.29 | q |
| Azodicarbonamide | 2.5 | 2.53 | 3 | 2.53 | 2.53 | 2.53 | 2.53 | 2.53 | r |

-continued

| | P-12 | P-13 | P-14 | P-1 | P-3 | P-15 | P-4 | P-16 | |
|---|---|---|---|---|---|---|---|---|---|
| (Parts by weight, based on 100 parts of resin, phr) | | | | | | | | | |
| Polyvinyl chloride, dispersion grade, inh. viscosity 1.0 | | 50 | 50 | 70 | | | | | a |
| Polyvinyl chloride, dispersion grade, inh. viscosity 0.9 | 75 | 50 | 50 | | 75 | 100 | 75 | 75 | b |
| Polyvinyl chloride, blending resin, inh. viscosity 0.9 | 25 | | | 30 | 25 | | 25 | 25 | c |
| Alkyl benzyl phthalate | | | | 16.8 | | | | | d |
| Polydodecyl benzene | 12 | 12 | 12 | 13.3 | 12 | | 12 | 13.5 | e |
| Alkyl aryl modified phthalate ester | | | | | | | | | f |
| Alkyl aryl hydrocarbon | | | | | | | | | g |
| Di(2-ethyl hexyl) phthalate | 8.02 | 4.2 | 3.27 | 2.91 | 2.52 | 62.5 | 2.53 | 6.36 | h |
| Butyl benzyl phthalate | 38 | 38 | 38 | 27.7 | 38 | | 38 | 31.5 | i |
| Epoxidized esterified tallate | | 5 | | | | | | 5.1 | j |
| Mineral spirits (boiling point range 300° F.–425° F. | 1.55 | 1.55 | 1.55 | | 1.55 | 1.55 | 1.55 | 1.55 | k |
| Diphenyl decyl phosphite | | | | | | | | | l |
| Dibasic lead phosphite | | 1.0 | | | | | | | m |
| Zinc oxide | | | | 0.86 | | | | | n |
| Zinc octoate (18% Zn) | | | 1.0 | | 0.95 | 0.95 | | | o |
| Lead octoate (24% Pb) | 1.11 | | | | | | 1.0 | 1.0 | p |
| Titanium dioxide | 5.29 | 5.29 | 5.29 | 3.64 | 5.29 | 5.29 | 5.29 | 5.29 | q |
| Azodicarbonamide | 2.53 | 2.5 | 2.53 | 2.32 | 2.53 | 2.53 | 2.53 | 2.53 | r |
| Anhydrous alumina silicate | | | | 12.3 | | | | | s |

The letters which have been positioned at the right hand side of each portion of the preceding table are used merely to facilitate the reading and the understanding of each portion of the table. They have no other significance.

All the plastisol compositions set forth in the preceding table are foamable resinous polymer compositions, inasmuch as azodicarbonamide is included in all the formulations. Such a blowing agent would be excluded if a non-foamable resinous polymer composition was desired or required.

If no backing sheet material such as a felted or matted fibrous web is to be used, then the plastisol may be doctored by a doctor blade, or roll coated, or poured, or cast, or otherwise applied to a strippable carrier which may be a steel belt, a rubber belt, release paper, or a felt or other fabric or material having a release coating thereon and subsequently stripped therefrom.

However, if a backing sheet material is to be used and is to remain as a part of the final product, then the plastisol may be doctored by a doctor blade, or roll coated, or poured, or cast, or otherwise applied and adhered to the carrying sheet material in a substantially uniform manner in a relatively uniform thin coating by procedures well-known in the art. The thickness of such a plastisol coating as a foamable resinous polymer composition, as applied and still wet, is in the range of from about 0.005 to about 0.050 inches, or even more, if so desired or required.

After the plastisol has been applied to the carrying backing sheet material, it is then heated under relatively gentle or moderate heat in an oven or other suitable heating device for a period of time of from about 1 minute to about 4 minutes at an elevated temperature of from about 240° F. to about 470° F., but more normal commercially from about 290° F. to about 350° F., whereby the plastisol firms and gels so that it can be more easily handled and processed subsequently. The temperature and time relationships are mutually interdependent and the higher the temperature, the shorter is the required time, and vice versa. The elevated temperature, however, is not sufficiently high as to activate or to decompose the particular blowing or foaming agent which may be present as to cause blowing or foaming of the resinous polymer composition.

The gelled, firm resinous polymer composition is then cooled and is printed or coated with a suitable printing ink composition in the desired or required pattern or design which may possess many colors. The particular pattern or design which is used does not relate to the essence of the invention and any suitable pattern or design may be selected.

The printing procedure is conventional and should require no further description, inasmuch as such procedures are well known in the industry and are described in many prior art patents.

If it is desired that different levels of heights of the blowing or foaming effects be obtained, then, predetermined parts or portions of the pattern or design printed on the surface of the resinous polymer composition contain a blow modifier or inhibitor in different amounts, concentrations, or types, and so forth, depending upon the variety of differential blowing or foaming effects desired. Such differential effects are well described in the previously mentioned United States Patents.

Naturally, if no differential effects are desired as a result of the blowing or foaming procedure, then, no blow modifying agents or inhibitors are included in the printing ink composition and the levels and the extent of the blowing or foaming action is generally uniform. Some typical and well known conventional printing ink compositions are noted in the previously mentioned United States Patents.

Additionally, there is included in certain predetermined parts or portions of the selected printed pattern or design a photoinitiator for a purpose to be described hereinafter more fully, with reference to certain reactive polymerizable monomers also to be described more fully hereinafter.

The concentration of the photoinitiator in the printing ink composition will vary and will range from about 1 percent by weight to about 40 percent by weight, and preferably from about 5 percent to about 30 percent by weight, based on the total weight of the printing ink composition.

The photoinitiators are compounds which will absorb radiation and convert the absorbed energy to a reactive triplet state which is a free radical and thus extremely reactive. One type of photoinitiator system utilized is by hydrogen abstraction. The existence of the carbonyl group is mainly responsible for the special properties of this photoinitiator system. Situated on the oxygen atom of the carbonyl group is a lone pair of electrons occupying a non-bonding orbital. The non-bonding orbital is an electronic transistion which confers free radical properties on the carbonyl group. The photo-activated carbonyl group must interact with another substance which can donate a hydrogen atom.

Compounds which in addition to the carbonyl group, contain other hereto atoms or groups which also have a lone pair of electrons associated with them seem to have a synergistic effect and the photo-activity of the carbonyl center is enhanced. Examples are thioxanthone and Michlers Ketone. Another type of photoinitiator system undergoes heterolytic fission to break the carbon to carbon bond within the molecule.

The concentrations of the remaining constituents of the printing ink compositions which includes resins, pigments and dyes, solvents and diluents, blow modifiers and inhibitors, plasticizers, etc., are conventional and are within the ranges noted in the prior art, such as the previously mentioned United States Patents. With particular reference to the blow modifiers or inhibitors, it is to be stated that, although essentially all of the blow modifiers or inhibitors mentioned in the aforesaid United States Patents are utilizable within the broader aspects of the present invention, three preferred and typical examples of such inhibitors are trimellitic anhydride, fumaric acid, and benzotriazole.

A few preferred and typical printing ink compositions are as follows:

|  | P-0 | P-00 | P-1 | P-2 | P-3 | P-4 | P-5 |
|---|---|---|---|---|---|---|---|
| Vinyl chloride-vinyl acetate copolymer 90/10 | 6.6 | 6.8 | 9.5 | 10.1 | 9.7 | 10.4 | 13 |
| Methyl ethyl ketone | 37.4 | 38.2 | 53.5 | 57.4 | 54.7 | 58.6 |  |
| Titanium dioxide ink concentration, 55% | 25 | 25 |  |  | 2.8 | 3.0 | 4 |
| Carbon black vinyl ink |  |  | 7.0 | 7.5 | 2.8 | 3.0 |  |
| Trimellitic anhydride | 30 | 20 | 25 | 25 | 25 | 25 | 1 |
| Fumaric acid 62.5% in dioctyl phthalate |  |  |  |  |  |  |  |
| Benzotriazole |  |  |  |  |  |  |  |
| Benzophenone | 1.0 | 10 | 5.0 |  | 5.0 |  | 3 |
| 2,3 Acetophenone |  |  |  |  |  |  |  |
| P-dimethyl amino |  |  |  |  |  |  | 3 |
| ethyl benzoate |  |  |  |  |  |  |  |

The printed, gelled potentially foamable plastisol is then allowed to dry and a wear layer in the form of a resinous polymer composition or plastisol is then applied thereto. Such a wear layer composition contains conventional or standard constituents, such as resins (preferred and typical being polyvinyl chloride, medium to low molecular weight), plasticizers, stabilizers, pigments or dyes (on rare occation), solvent and diluents, viscosity improvement and controlling agents, and like additives and materials. The concentrations of such constituents are conventional and standard and are in the ranges set forth in the previously cited United States Patents.

Additionally, there can be included in the wear layer composition, an acrylic monomer capable of being polymerized and cross-linked.

The resins are usually low molecular weight polymers or "oligomers" containing a functional group which participates in the polymerization process. The unsaturated resins commonly employed are such compounds containing polar groups preferably urethanes.

The monomers employed are important to the final film properties such as flexibility, adhesion, toughness and hardness. The monofunctional monomers lower the viscosity of the ultra-violet curable formulation. The monofunctional monomers are also extremely important to the cure rate of the system. For instance, acrylate monomers cure approximately ten times faster than methacrylate monomers which, in turn, are more responsible than vinyl esters, vinyl ethers or styrenes. Monomers that can be polymerized according to this invention have at least one polymerizable ethylenically unsaturated group.

The inherent viscosities of the polyvinyl chloride resins used in such wear layer compositions are in the range of from about 0.6 to about 1.2 but, depending upon conditions and circumstances, may be as high as about 1.6, as measured and determined by A.S.T.M. D-1243-66 prior to the initiation of the mechanical embossing procedure, which will be more fully described hereinafter.

The particular curable monomer or monomers which are selected for a particular use must, of course, be compatible with or dispersible in the resin representing the major constituent in the resinous wear layer formulation. It is usually contained in a copolymer, polymer or homopolymer of polyvinyl chloride. That is, the curable monomer must be miscible or dispersible in substantially all proportions with the main resin and must be capable of being easily and intimately dissolved or dispersed therein without separating into separate, distinct layers or portions, or occupying separate, discrete portions or phases in the resinous wear layer composition.

The thickness of such a resinous wear layer composition, as first applied to the printed pattern or design and still wet, is in the range of from about 0.002 to about 0.030 inches, or greater, if so required by special circumstances, requirements, or conditions.

Preferred and typical formulations for the wear layer are noted in the previously cited United States Patents, except that the reactive polymerizable monomer or monomers were not included therein.

After the wear layer containing the polymerizable monomers has been applied and adhered to the printed pattern or design of the printing ink composition, it is heated under moderately gentle heat in an oven or other suitable heating device for a period of time of from about 1 minute to about four minutes at an elevated temperature of from about 240° F. to about 470° F., whereby it hardens or firms i.e. "gels" so that it can be easily handled in further operations. The temperature and time are so interrelated as to be interdependent and the higher the temperature, the shorter is the time of application of the heat, and visa versa. The elevated temperature, however, must not be that high as to activate or decompose the blowing or foaming agent which is normally present. Also, the temperature and the time must not be that great as to bring about a thermal polymerization of the reactive polymerizable monomers in the wear layer.

A few preferred and typical wear layer compositions are as follows:

over those portions of the printing ink composition which contain a photoinitiator are polymerized or cross-linked, and possess an increased melt viscosity, therefore dull surface.

There are many irradiation techniques which can be employed to initiate curing and to promote cross-linking of surface coatings. Electron beam, gamma and x-ray treatment are examples of very high energy irradiation techniques which promote extremely rapid polymerization and are not recommended for purposes of this invention unless used at low energy levels.

For purposes of this invention, ultra-violet radiation is the preferred source. Ultra-violet radiation induces a photochemical reaction which produces free radicals from the photoinitiators. These free radicals in turn cause polymerization of the monomers, reactive pre-polymers, and inert polymers present resulting in a cured film.

Sources of ultra-violet radiation can be mercury vapor arc lamps, plasma arcs, pulsed xenon lamps and carbon arcs. Mercury vapor arc lamps are currently the most commonly used and consist of three types: Low;

| (Parts by weight, based on 100 parts of resin, phr) | | | | | | | | | | | | | | | |
|---|---|---|---|---|---|---|---|---|---|---|---|---|---|---|---|
| | W-1 | W-2 | W-3 | W-4 | W-5 | W-6 | W-7 | W-8 | W-13 | W-14 | W-9 | W-10 | W-12 | W-15 | W-11 |
| Polyvinyl chloride, low molecular weight dispersion grade, inherent viscosity 0.8 | 100 | 100 | 100 | 100 | 100 | 100 | 100 | 100 | 100 | 100 | 100 | 100 | 100 | 100 | 100 | a |
| Di(2-ethylhexyl)phthalate | | 5.0 | | 2.0 | | | | 4.0 | 8.0 | | | 5.0 | 1.0 | | | b |
| Tricresyl phosphate | | | | | | | | | | | | | | | | c |
| Epoxidized soya oil | 2.7 | 2.7 | 2.7 | 2.7 | 2.7 | 2.7 | 2.7 | 2.7 | 2.7 | 2.3 | 2.7 | 2.7 | 2.7 | 2.7 | 2.7 | d |
| Alkyl aryl modified phthalate ester | | | | | | | | | | 21.1 | | | | | | e |
| Epoxidized tall oil ester | | | | | | | | | 2.7 | | | | | | | f |
| 2,2,4-trimethyl-1,3-pentanediol diisobutyrate | 3.7 | 3.7 | 3.7 | 3.7 | 3.7 | 3.7 | 3.7 | 3.7 | 8.0 | 3.2 | 3.7 | 3.7 | 3.7 | 3.7 | 3.7 | g |
| Butyl benzyl phthalate | 15.5 | 15.5 | 15.5 | 15.5 | 15.5 | 15.5 | 15.5 | 15.5 | 8.0 | | 15.5 | 15.5 | 15.5 | 15.5 | 15.5 | h |
| Polydodecyl benzene | 4.6 | 4.6 | 4.6 | 4.6 | 4.6 | 4.6 | 4.6 | 4.6 | | | 4.6 | 4.6 | 4.6 | 4.6 | 4.6 | i |
| Ba—Zn phosphite stabilizer | 6.6 | 6.6 | 6.6 | 6.6 | 6.6 | 6.6 | 6.6 | 6.6 | 6.6 | 6.6 | 6.6 | 6.6 | 6.6 | 6.6 | 6.6 | j |
| Nonyl phenyl polyethylene glycol ether | | | | | | | | | | 1.3 | | | | | | k |
| Ethyl-2-cyano-2,3-diphenyl acrylate | | | | | | | | | | 0.38 | | | | | | l |
| Violet toner | | | | | | | | | | 0.01 | | | | | | m |

| | W-1 | W-2 | W-3 | |
|---|---|---|---|---|
| Acrylated Pluracol TP-340 (Basewyandotte Polyether - Average Mol. Wt. 300) | | | | n |
| 1,6-Hexanediol diacrylate | | | | o |
| Isodecyl Acrylate | | | | p |
| Urethane Oligomer | | | | q |
| Neopentyl Glycol Diacrylate | 25 | | | r |
| (Methyl Carbanyl) Ethylacetate | | 20 | | s |
| Methacrylated Polyester | | | 27 | t |
| Pentaery Thritol Triacrylate | | | | u |
| Trimethylolpropane Triacrylate | | | | v |
| Acrylonitrile | | | | w |
| B-Hydroxyethyl Acrylate | | | | x |
| Acrylated Epoxy Resin (Shell Chemical DRH-302 Bisphenol A Epichlordphydrin Resin) | | | | y |
| 2-Ethylhexyl Acrylate | | | | z |

Viscosities for curable systems are generally in the range of 3,000 to 15,000 cups at ambient temperatures. Much higher viscosity coatings have been used, however, very low viscosity coatings are generally avoided.

The wear layer coating can be applied by means of a direct roll coater, however, other means of application such as spray coating, curtain coating, extrusion coating and the like can also be employed.

The wear layer is then subjected to actinic radiation curing, preferably ultra-violet radiation, to polymerize the predetermined portions of the wear layer which lie Medium; and High pressures. High pressure mercury arc lamps are the most intense source of ultra-violet being ten times more powerful than the medium pressure lamps, but they operate at very high temperatures, thus water cooling is generally required.

The radiation can be carried out in a nitrogen atmosphere or in air. The volumes of nitrogen or air sweep maintained across the web will depend mainly on the line speed and the opening gap between the web and the lamps. A high enough flow of nitrogen is necessary to exclude oxygen. Whether the ultra-violet coating be an air or nitrogen curable coating sufficient gas sweep (Nitrogen or air) is necessary because at operating temperatures in the range of 100° F. to 180° F. there is some volatilization of reactive monomers in the ultraviolet lamping oven which must be removed. Otherwise they will deposit on the lamps and reflectors and degrade. The resulting deposition and degradation of reactive monomers leads to loss of efficiency of the ultra-violet lamps and, consequently, can lead to incomplete cure. The gas sweep is such that it, in effect, sets up a laminar flow holding any monomer fumes on the moving web and exhausts said fumes out of the exit of the ultra-violet lamping oven.

The ultra-violet lamping oven is a series of medium pressure mercury arc lamps operating in the 1800 A to 4000 A wavelength range providing 750 watt per linear inch of ultra-violet radiation across the entire coated surface of the web. The amount of ultra-violet lamps and lamp intensity is governed by line speeds, coating chemistry and thickness of coating.

In the preferred embodiment of the invention, a combination of air and nitrogen is utilized. The sheet is first exposed to ultra-violet in air for about one half to two seconds and then exposed to ultra-violet in a nitrogen atmosphere for a similar period of time.

The product is then passed through an oven to fuse the composition and if present to decompose the blowing agent and form the foam layer.

Fusion is normally obtained at a temperature of from about 325° F. to about 470° F., depending upon the particular polymeric product being used. Such temperature also must be sufficient as to activate or decompose the particular blowing or foaming agent which is present in the plastisol. It is again to be observed that blowing and foaming temperatures, as well as fusion and gelling temperatures, are ambient air temperatures and not temperatures of the product exposed to such ambient air temperature.

Reference to the drawings, and particularly to FIGS. 2 and 3 thereof will clarify the actions which take place during such blowing and foaming procedures. The plastisol or the originally potentially foamable resinous polymer composition initially contained a blowing or a foaming agent therein, such as azodicarbonamide, which was substantially uniformly distributed therein. However, those portions of the printing ink composition 18 lying in zones A additionally contained a blowing or foaming modifier, such as an inhibitor, and hence those portions of the resinous polymer composition lying thereunder in zones A are relatively unblown or unfoamed due to the inhibiting action of the blowing or foaming inhibitor. On the other hand, those portions of the printing ink, composition 18 lying in zones B did not contain any blowing or foaming modifier, such as an inhibitor, and hence such portions of the resinous polymer composition lying thereunder in zones B are relatively blown or foamed substantially completely. Such actions are well described in the previously mentioned United States Patents.

Additionally, those portions of the printing ink composition 18 in zones A also contained a photoinitiator which was activated during the exposure to radiation, to polymerize and/or cross-link the reactive polymerizable monomer in the wear layer 22. As a result, such portions retained their flat, dead or dull mat finish or texture throughout the blowing or foaming operation.

The sleek, glossy or lustrous finish areas should have gloss levels in the range of from about 15 to about 90, or even higher; the flat, dead or dull mat finish areas should have gloss levels in the range of from about 70 down to about 3, or even less; with the differences in the gloss levels between the two contrasting finishes being in the range of at least about 10 in gloss level ranges below 50 and at least about 20 in gloss level ranges equal to or above 50. Such numerical gloss level values are determined by the procedures set forth in A.S.T.M. 523-67 (1972) at an angle of 60°.

The final resulting product, in one form thereof, greatly resembles a ceramic tile flooring such as is commonly found in bathrooms, both as floor and wall surfaces. The sleek, glossy or lustrous finish of the raised areas, greatly resembles the surface of a glazed or fired ceramic tile, whereas the flat, dead or dull mat surface greatly resembles the depressed grout or cementitious materials which are placed between the glazed ceramic tile.

Reference to sleek, glossy or lustrous finishes, as compared to flat, dead or dull mat finishes, is merely a typical or preferred embodiment of the present inventive concept. These terms or phrases are comparative or relative terms or phrases and are used merely or primarily to indicate differences in gloss levels.

For example, the principles of the present inventive concept are equally applicable to the obtaining of a sleek, glossy or lustrous finish in some certain selected areas and the obtaining of even more sleek, glossy or lustrous finishes in certain other selected areas, again keeping the differences in the gloss level values greater than about 20, inasmuch as the gloss levels involved in such embodiment will be greater than about 50.

The Modification of FIGS. 4 and 4A

It has been previously stated herein that the base layer or substrate 11 may comprise simply a fibrous backing sheet material and that other layers, such as non-foamable or potentially foamable resinous polymer compositions or plastisols or other sheet materials may be omitted.

Such a modification is illustrated in FIGS. 4 and 4A which depict, respectively, the resinous polymer sheet material before and after the completion of the embossing and subsequent heating steps in its manufacture. In these Figures, there is shown a resinous polymer sheet material 30 comprising a relatively flat backing sheet material 32 of fibrous nature, such as an asbestos felt, upon which is printed a printing ink composition 38 in the form of a desired pattern or design in a plurality of colors, as usual. If necessary, a smoothing or leveling resinous polymer coating, such as an acrylic coating, may be applied to the asbestos felt 32, if its surface is too uneven, hairy, fibrous, or irregular before the printing of the printing ink composition 38 thereon. No blow modifiers or inhibitors are included in any portion or color of the printed pattern or design. However, a photoinitiator is included in the portions 40 of the printed pattern or design, whereas no initiator is included in the portion 41. A wear layer 42 is then applied over the surface of the printed pattern or design in the usual way and contains a polymerizable reactive monomer substantially uniformly. The wear layer 42 is then exposed to radiation to crosslink the monomer for a sufficiently long period of time as to create on its surface the desired finish or texture, such as a flat, dead or dull mat finish or texture and then the composite is passed through an oven to fuse the composition.

The relatively flat, dead or dull mat finish or texture is designated in FIG. 4A by the reference letter A and it is to be noted that such areas are in complete and precise registry with the areas 40 containing the photoinitiator and with the particular color of the printed pattern or design containing such material. Also, the relatively sleek, glossy or lustrous surfaces are designated by the reference letter B and are over areas of the printing ink composition which do not contain any photoinitiator and thus in complete and precise registry with such areas which contain different colors of the printed pattern or design.

The present invention will be described further with particular respect to the following specific examples, wherein there are shown preferred and typical embodiments of the present invention. However, it is to be appreciated that such specific examples are primarily illustrative of the general principles of the present invention and that the specific materials, chemicals, patterns, designs and other particular aspects should not be construed as limitative of the broader scope of the present inventive concept, except as defined by the scope and the spirit of the attached claims.

EXAMPLE I

A resinous polymer sheet material is made by the following procedures:

The base layer or substrate comprises a relatively flat, 0.040 inch thick fibrous sheet of felted asbestos fibers with an acrylic smooth leveling coating thereon. The asbestos felt fiber sheet is coated substantially uniformly to a wet thickness of about 0.015 inch with the following potentially foamable resinous polymer plastisol composition:

|  | Parts by Weight |
|---|---|
| Polyvinyl chloride, medium mol. wt., general purpose dispersion resin, inh. viscosity 0.99 (ASTMD1243-66) | 30.2 |
| Polyvinyl chloride, medium mol. wt., dispersion grade resin, inherent viscosity 1.0 | 8.2 |
| Polyvinyl chloride, medium mol. wt., blending resin, inherent viscosity 0.9 | 17.1 |
| Anhydrous alumina silicate filler | 6.9 |
| Butyl benzyl phthalate | 15.4 |
| Alkyl benzyl phthalate, low b.p. plasticizer | 9.3 |
| Polydodecyl benzene | 7.4 |
| Azodicarbonamide | 1.1 |
| Accelerator/stabilizer | 0.4 |
| Titanium dioxide | 2.5 |
| Dioctyl phthalate | 1.5 |
| Wetting agent | 0.0 |

Gelling and firming of the potentially foamable plastisol is accomplished in an oven at an elevated temperature of about 300° F., for about three minutes. The temperature is not sufficiently elevated as to activate or decompose the azodicarbonamide.

The gelled potentially foamable plastisol is then printed with a ceramic brick pattern or design as shown in FIGS. 2 and 3 of the drawings. Zones B are printed with a standard or conventional printing ink composition containing a predetermined pigment but which does not contain any blow modifier or inhibitor or any free-radical polymerization initiator or organic peroxide. Such a standard or conventional printing ink composition comprises:

|  | Parts |
|---|---|
| Solution grade copolymer of vinyl chloride (90 parts) and vinyl acetate (10 parts) | 15 |
| Methyl ethyl ketone | 85 |
| Pigment or coloring agent, as desired or required | |

Zones A, however, are printed with the following printing ink composition containing a different pigment or coloring agent:

|  | Parts |
|---|---|
| Solution grade copolymer of vinyl chloride (90 parts) and vinyl acetate (10 parts) | 10.5 |
| Methyl ethyl ketone | 59.5 |
| Benzotriazole | 10 |
| Benzophenone | 10 |
| p-Dimethylamino ethylbenzoate | 10 |
| Pigment or coloring agent, as desired or required | |

The printed gelled potentially foamable plastisol is then allowed to dry and a wear layer is applied thereto to a wet thickness of about 0.015 inch and having the following formulation:

|  | Parts |
|---|---|
| Polyvinyl chloride, dispersion grade, inherent viscosity 0.8 | 100 |
| Trimethylolpropane trimethacrylate | 20 |
| Butyl benzyl phthalate plasticizer | 13.8 |
| 2,4,4-trimethyl pentyl-3,5-diisobutyrate | 3.3 |
| Alkyl benzyl phthalate low boiling point plasticizer | 4.1 |
| Ba—Zn phosphite heat stabilizer | 6.4 |
| Epoxidized tall oil | 2.4 |

Gelling and firming of the wear layer plastisol is accomplished by heating in an oven atmosphere having an elevated temperature of just under 300° F., for a period of time of about 3 minutes.

The coating composition was exposed to radiation first in air and then in a nitrogen atmosphere by exposing for one second in each stage to irradiation with a 200 watt/inch Hanovia medium pressure mercury vapor lamp.

The material is then heated in a fusion oven maintained at an elevated temperature of about 395° F., for about 2.75 minutes. Fusion of the resins takes place, along with the blowing and foaming of the potentially foamable plastisol in those areas not lying directly under the trimellitic anhydride inhibitor in the printing ink composition. There is very little blowing or foaming in the areas lying directly under the trimellitic anhydride. The chemical embossing differential effect is excellent.

In addition, the elevated portions or lands of the wear leayer, as seen in FIG. 3 of the drawings, develop a sleek, glossy or lustrous finish or texture, with high brilliance and sheen, whereas the lower or depressed portions or mortars retain the flat, dead or dull mat finish created therein by the actinic radiation cured polymers. The appearance of the material, after the blowing or foaming cycle is very much like that of a glossy, glazed ceramic tile of high sheet, surrounded by a flat, dead or dull mat finish giving the appearance of grout or other cementitious material between the ceramic tiles.

The different colors of the printed pattern or design of the printing ink composition are in complete and perfect registry with (1) the above-described mechanical embossing effects of the contrasting sleek, glossy or lustrous areas and the flat, dead or dull areas, as well as (2) the above described chemical embossing effect of higher and lower areas on the surface of the wear layer.

It is also to be observed that there is complete and perfect registry between: the flat, dead or dull textured portions of the wear layer; their corresponding colored portion of the pattern or design of the printing ink composition; and the relatively unblown or unfoamed portions of the resinous polymer composition 16. At the same time, there is complete and perfect registry between: the sleek, glossy or lustrous finish surfaces; their corresponding colored portions of the patterns or design of the printing ink composition; and the blown and foamed portions of the resinous polymer composition.

EXAMPLE II

A resinous polymer sheet material is made as follows: The procedures described in Example I are followed substantially as set forth therein with the exception that the trimellitic anhydride is omitted from the printing ink composition.

The results obtained in this Example are generally comparable to the results obtained in Example I, with the exception that the resinous polymer sheet material of this Example is not chemically embossed and the blowing or foaming operation is substantially uniform in its effect whereby the surfaces of the wear layer are substantially level and of the same height. The flat, dead or dull embossed mat finish and the sleek, glossy or lustrous finish lie substantially in the same level plane.

EXAMPLE III

A resinous polymer sheet material is made following the procedure in Example II with the exception that, in addition to the omission of the trimellitic anhydride blow modifier or inhibitor from the printing ink composition, the azodicarbonamide blowing or foaming agent is omitted from the plastisol layer.

The results obtained in this Example are generally comparable to the results obtained in Example II, with the exception that the resinous polymer composition or plastisol is not chemically blown or foamed at all and the result is a more dense, non-cellular polymer sheet material in which the fused resins are heavier and are not too much unlike that portion of the fused resins illustrated in FIG. 3 of the drawings, lying under the portions of the printing ink composition containing the blow modifier or inhibitor. Such portions are identified in FIG. 1 by the reference letter A. Substantially all portions of the fused plastisol are similar.

Although the present invention has been described in great particularity in the numerous preceding specific examples wherein there are shown preferred and typical embodiments of the inventive concept, such is not to be construed as limitative of the broader aspects of the inventive concept but only illustrative thereof. The specific materials, chemicals, patterns, designs and other particular aspects of such examples are simply illustrative and do not limit the broader scope of the invention which is limited and defined by the scope and the spirit of the appended claims.

What is claimed is:

1. A process for the production of a surface covering having both dull areas and glossy areas on its surface, which process comprises the steps of:
    (a) laying down a base layer,
    (b) selectively applying to said base layer in the form of a design having defined areas where a dull surface appearance is desired, a photoinitiator,
    (c) applying a resinous composition wear layer uniformly over the surface prepared in step (b), said resinous composition containing a curable monomeric material therein,
    (d) subjecting the surface prepared in step (c) to a sufficient amount of heat for a sufficient amount of time to gel the resinous composition wear layer, thereby providing said wear layer with a dull overall appearance, but without providing sufficient thermal energy to cure the monomeric material contained uniformly therein,
    (e) subjecting the surface of the gelled wear layer to actinic radiation to selectively cure and harden the monomeric material over those areas where the photoinitiator was selectively applied, thereby permanently securing a dull appearance to the wear layer over such defined areas, and
    (f) subjecting the composition of step (e) to a sufficient amount of thermal energy to permit the remaining uncured resinous composition to flow from a dull appearance into a glossy appearance and cure and harden in such a condition, without affecting the dull appearance of the surface on those areas cured and hardened by actinic radiation in step (e) thereby providing a surface covering having both dull and glossy areas on its surface.

2. The process of claim 1, wherein the base layer is a foamable resinous composition containing a heat decomposable blowing agent and the thermal energy provided in step (f) is sufficient to decompose said blowing agent and form a foam layer.

3. The process of claim 1, wherein the curable monomeric material is trimethylolpropane trimethacrylate.

4. The process of claim 2 wherein the base layer is selectively over printed with a printing composition containing a compound which inhibits the action of the blowing agent, such that after the provision of thermal energy in step (f), the areas directly underneath said printing composition will exhibit a foam layer lower in thickness.

5. The process of claim 4 further characterized in that the photoinitiator is contained in the same printing composition with the blowing inhibitor.

6. The process of claim 2 wherein the resinous composition is a polyvinylchloride composition.

7. The process of claim 1 wherein the provision of actinic radiation is carried out in two stages, with a first stage being carried out in air, and a second stage being carried out under a nitrogen atmosphere.

8. The process of claim 1 wherein the photoinitiator employed is thioxanthone.

9. An intermediate resinous polymeric sheet material for use in making a surface covering product having both dull areas and glossy areas on its surface, which intermediate sheet comprises:
    (a) a base layer or substrate,
    (b) a photoinitiator selectively applied over said base layer or substrate in the form of a design having defined areas where a dull surface appearance is desired, (c) a resinous polymeric wear layer uniformly covering the product defined in step (b) containing a curable monomeric material therein, which resinous polymeric wear layer is gelled to produce a uniform dull appearance on its surface, wherein, the sheet material may first be exposed to actinic radiation to selectively polymerize the monomeric material directly over those areas where the photoinitiator has been selectively applied, to permanently secure the dull appearance on the surface of such areas, and may thereafter be exposed to sufficient thermal energy to cause the uncured monomeric material in the remaining areas to flow from a dull appearance to a glossy appearance and polymerize in that condition to provide a surface covering product having both dull areas and glossy areas on its surface.

10. The product of claim 9 wherein the resinous polymeric wear layer is a polyvinylchloride composition.

11. The product of claim 9 wherein the curable monomeric material is trimethylolpropane trimethacrylate.

* * * * *